(12) United States Patent
Bosse

(10) Patent No.: US 6,442,471 B1
(45) Date of Patent: Aug. 27, 2002

(54) DRIVE TRAIN CONTROL OF A VEHICLE HAVING CONTINUOUSLY VARIABLE TRANSMISSION

(75) Inventor: Rolf Bosse, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/699,616

(22) Filed: Oct. 30, 2000

Related U.S. Application Data

(63) Continuation of application No. PCT/EP99/01880, filed on Mar. 22, 1999.

(30) Foreign Application Priority Data

Apr. 30, 1998 (DE) .......................... 198 19 481

(51) Int. Cl.[7] .................. F02D 41/04; F02D 41/06
(52) U.S. Cl. ................. 701/104; 123/350; 123/362
(58) Field of Search .................. 701/104, 110; 123/350, 362

(56) References Cited

U.S. PATENT DOCUMENTS

| | | | |
|---|---|---|---|
| 4,507,986 A | 4/1985 | Okamura et al. | 477/43 |
| 4,596,164 A | 6/1986 | Hasegawa et al. | 477/98 |
| 4,699,025 A | 10/1987 | Omitsu | 477/43 |
| 5,243,948 A | 9/1993 | Schnaibel et al. | 123/492 |
| 5,392,215 A * | 2/1995 | Morita | 701/94 |
| 5,468,195 A | 11/1995 | Kashiwabara | 477/46 |
| 5,655,992 A | 8/1997 | Hattori | 477/107 |
| 5,846,157 A | 12/1998 | Reinke et al. | 477/48 |

FOREIGN PATENT DOCUMENTS

| | | |
|---|---|---|
| DE | 3628490 | 4/1987 |
| DE | 3813390 | 11/1989 |
| DE | 3929875 | 3/1991 |
| DE | 4139244 | 12/1992 |
| DE | 19505687 | 8/1996 |

OTHER PUBLICATIONS

Abstract of Japan 61–6453; M–484 Jun. 3, 1986, vol. 10.

* cited by examiner

*Primary Examiner*—Andrew M. Dolinar
(74) *Attorney, Agent, or Firm*—Baker Botts LLP

(57) ABSTRACT

A control system controls operation of a vehicle drive train during acceleration to avoid regions of engine torque and speed which result in high emissions. The system responds to operator control signal, engine speed signals and optionally engine temperature signals and provides output signals to control the fuel injection to thereby control engine torque.

8 Claims, 5 Drawing Sheets

DRIVE TRAIN CONTROL OF A VEHICLE HAVING CONTINUOUSLY VARIABLE TRANSMISSION

This application is a continuation of Patent Cooperation Treaty application PCT/EP99/01880, filed Mar. 22, 1999.

BACKGROUND OF THE INVENTION

The invention relates to a drive train management function of a vehicle having an internal combustion engine and a continuously variable transmission (CVT), and the invention more particularly relates to a control system for a drive train which reduces emissions.

In present-day motor vehicles, especially motor vehicles with direct injection engines, such as diesel engines, an increase in engine speed is achieved through a continuous increase in the quantity of fuel injected. During the increase, the feedback effect of the transmission on the engine speed generally is not taken into account.

A disadvantage of the customary methods for regulating fuel injection quantity is that, during acceleration, regions with poor pollutant emission characteristics can be traversed, which can lead to the emissions behavior of the drive train and thus the motor vehicle being poor. This applies in particular to the start-up behavior of a motor vehicle.

An object of the present invention is to create a method and a device that improve the emissions behavior of a drive train.

SUMMARY OF THE INVENTION

According to the present invention, there is provided a method for operating a drive train having an internal combustion engine and a continuously variable transmission, where the internal combustion engine is capable of being operated using a controllable torque buildup. The torque buildup is controlled during acceleration of the internal combustion engine to avoid regions of torque and engine speed that correspond to high emissions in the emissions performance graph.

In case of the internal combustion engine that is a fuel injection engine, it is advantageous to control torque buildup by controlling the fuel injection for a selected range of engine speed. In this regard, the injection quantity of fuel can be limited to selected values as a function of the engine speed.

Moreover, the injection quantity can be limited as a function of at least one of the following: the oil, water and engine temperature, and transmission temperature. The temperature function can take the form of a factor that is multiplied by selected values of fuel injection quantity for a specific engine speed. In a preferred embodiment, the factor is a number between zero and one.

According to the invention, there is provided a system for controlling a drive train for reduced emissions. An operator activated torque control provides a signal representing desired acceleration, a sensor provides a signal representing engine speed, and a processor, which is responsive to the desired acceleration signal and engine speed signal, is programmed to provide an output torque control signal. The processor is programmed to provide output torque control signal values that avoid regions of torque and engine speed corresponding to high emissions operation of the engine. Preferably the torque control signal regulates the injection of fuel.

For a better understanding of the present invention, together with other and further objects thereof, reference is made to the following description, taken in conjunction with the accompanying drawings, and its scope will be pointed out in the appending claims

BRIEF DESCRIPTION OF THE DRAWINGS

The invention is described in detail below with reference to the drawings.

DETAILED DESCRIPTION OF THE INVENTION

Figure 1:
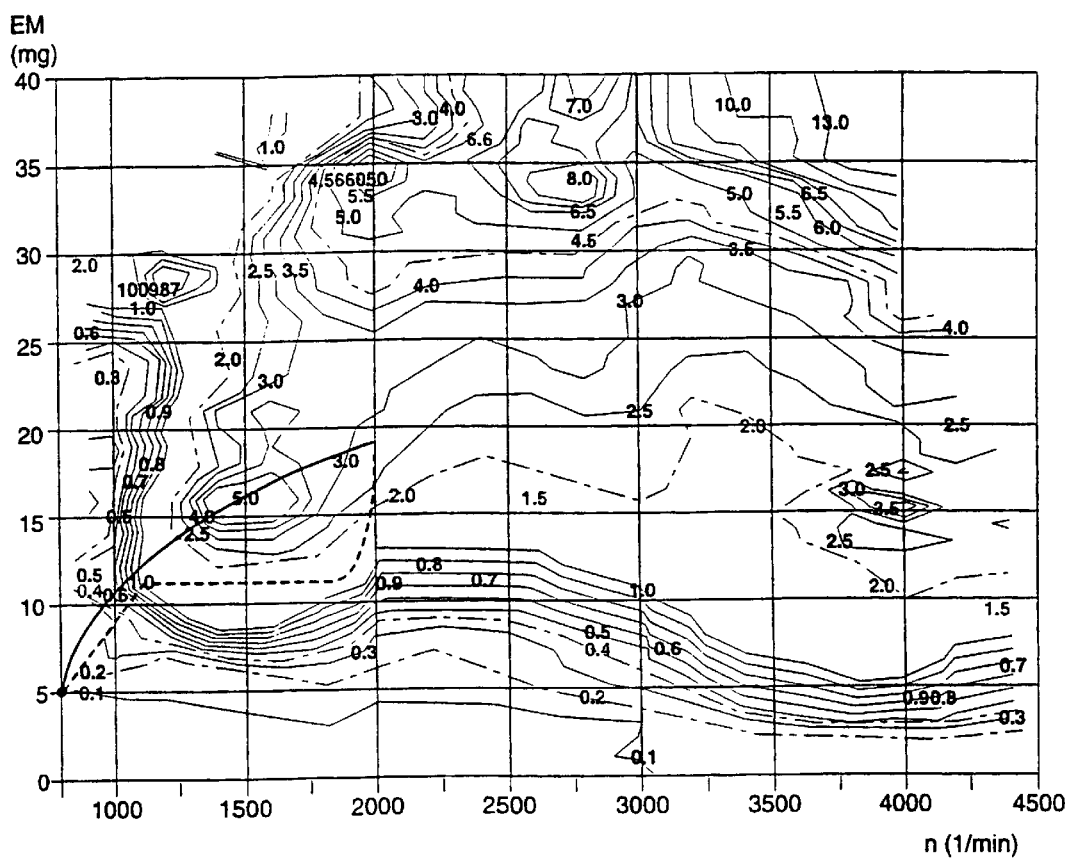
FIG. 1 shows a representation of the emission behavior of a drive train showing acceleration behavior with and without injection quantity reduction.

FIG. 1 shows a representation of an emissions performance graph. Emissions are shown as contours as a function of fuel injection quantity EM in units of mg and engine speed n in units of RPM. The emissions of an arbitrary pollutant, in the present case particulate emissions of a diesel engine, are represented here in the form of contour lines, where the numbers associated with the contour lines represent arbitrarily chosen units. This is a performance graph which is intended only to clarify the effect of fuel injection quantity limitation. Thus, the type of emission, such as the number of particles emitted, NOx emissions, etc., is unimportant. Clearly visible in the performance graph is an "emission mountain" with a peak value of 5.0 at an engine speed of approximately 1500 RPM, and a fuel injection quantity of approximately 16 mg. The heavy, solid, line reflects a startup process without any limitation of the fuel injection quantity. It is obvious that the curve shown more or less runs over the "emission mountain." In other words, the curve passes over the emission peak at the engine speed of approximately 1500 RPM. This results in poor average emissions behavior.

Emission can be reduced when the emission peak is avoided by limiting the quantity of injected fuel to approximately 12 mg for an engine speed lower than 1700 RPM. The curve representing the startup process with a limitation of fuel injection quantity is shown by the dashed curve in FIG. 1. This modified acceleration process requires a rapid increase in the fuel injection quantity in the engine speed range from 1700–2000 RPM. To avoid the high emissions region, a continuously variable transmission is needed to ensure the fastest possible adjustment of the engine speed. The measurements were performed on a US version TDI engine with 1.9 liter displacement and 66 kW power output.

FIGS. 2a–2d show the effects of quantity reduction during an acceleration phase of an emissions test. Shown is the time t in seconds, specifically seconds 345–355, where the dashed curves each represent a vehicle with manual transmission and no quantity limitation, while the solid lines represent a vehicle with a rapidly adjusting CVT transmission and quantity limitation.

Figure 2A:
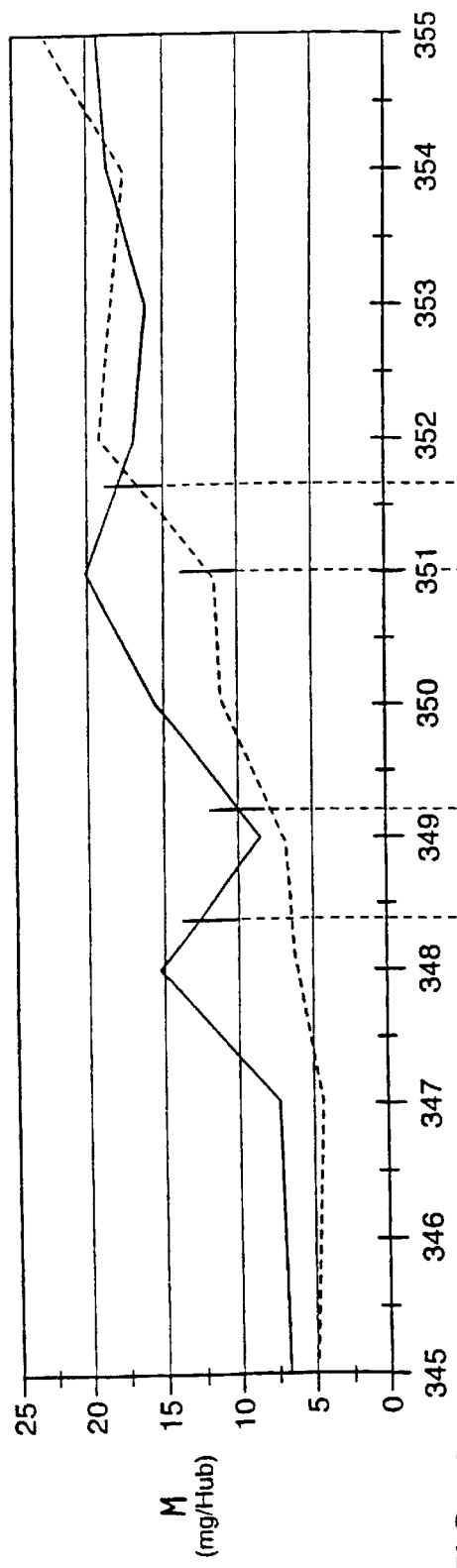
FIGS. 2a–d show the curve of an acceleration phase for a manual transmission without fuel injection quantity reduction and for a CVT transmission with fuel injection quantity reduction for various parameters.

FIG. 2a shows the injected fuel quantity M in mg per stroke for the specified time interval during the acceleration phase.

Figure 2B:
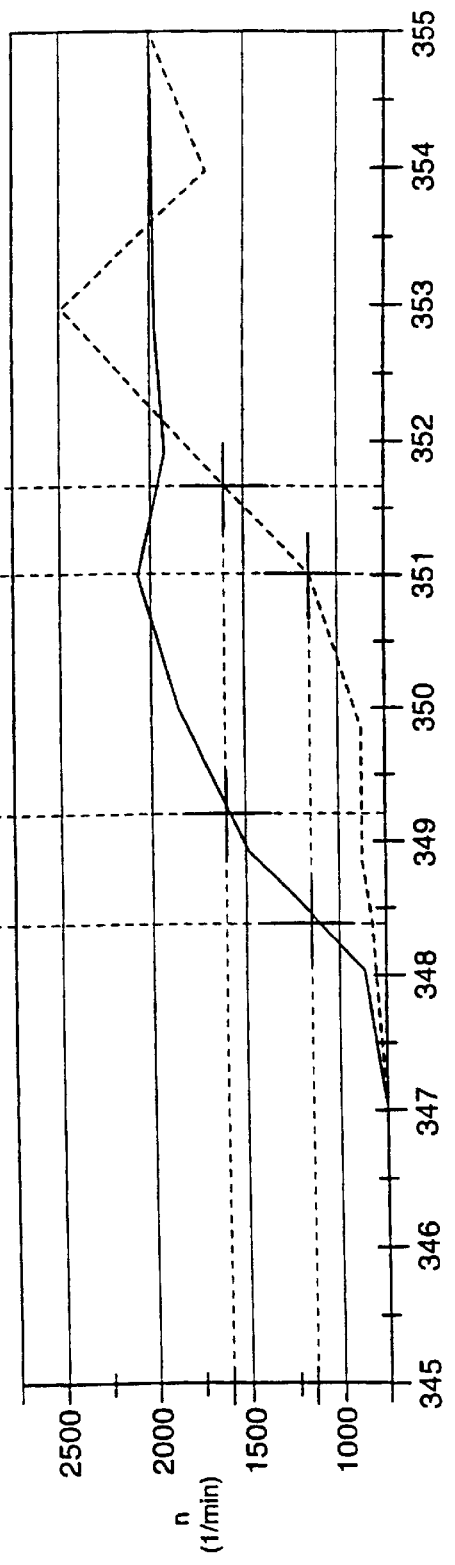

FIG. 2b shows the engine speed curve n in RPM during the same interval.

Figure 2C:
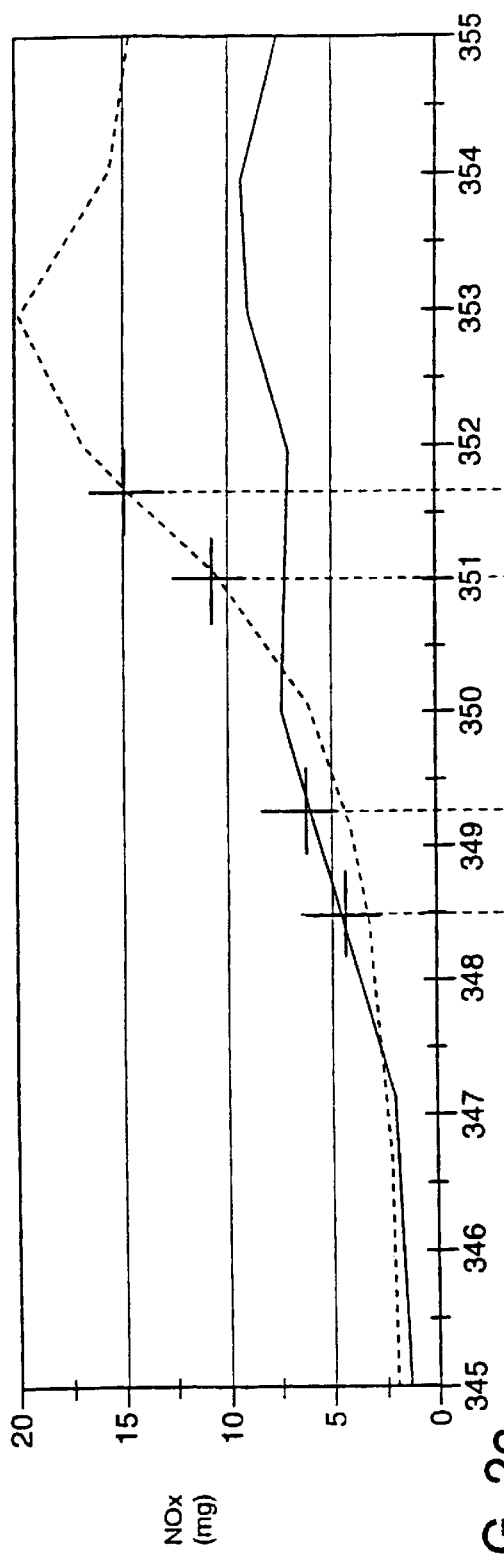

FIG. 2c shows NOx emissions during said interval. It can be seen that significantly less NOx is generated as a result of the quantity reduction.

Figure 2D:
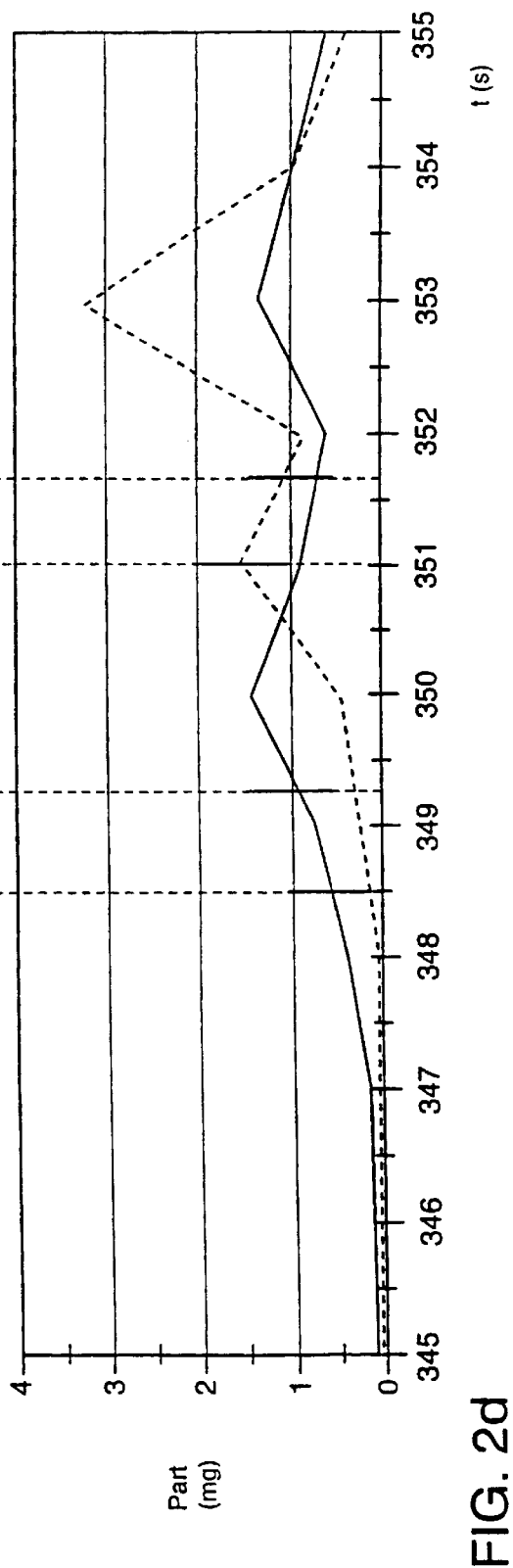

FIG. 2d shows particulate emissions Part in mg, e.g., diesel exhaust particulate emissions for the case of a diesel engine, during said time interval. Here, too, the engine without quantity limitation emits considerably more particulate matter than the quantity-limited process.

Figure 3:
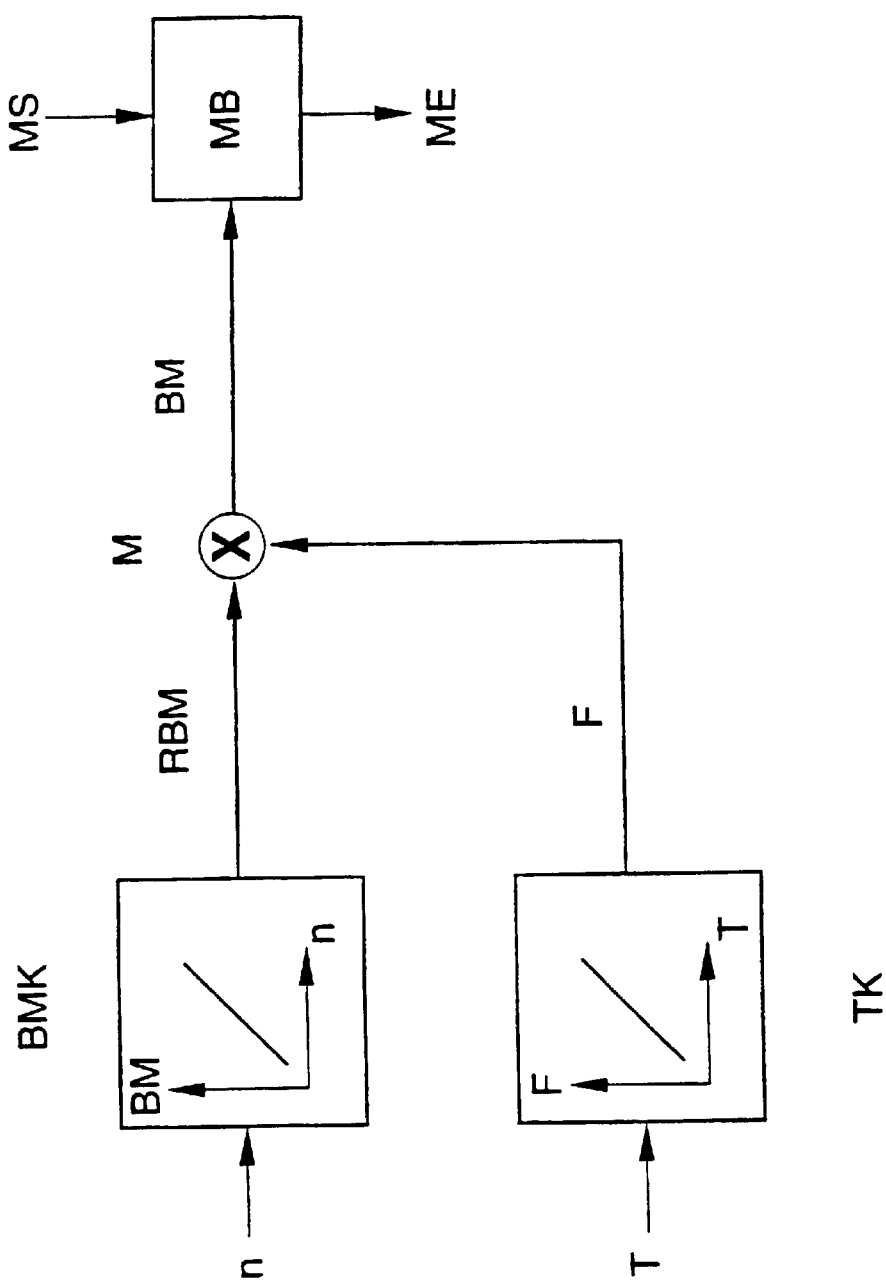
FIG. 3 illustrates the process of engine control.

FIG. 3 shows a block diagram of the process. Based on the current engine speed n, the processor (see FIG. 4) takes the selected value of a torque control signal from the stored limitation characteristic curve BMK, in which the selected value of torque control signal representing fuel injection quantity BM is represented as a function of the engine speed n, and outputs the limiting value of torque control signal RBM. Since both the engine temperature and the transmission temperature T influence the engine's emission behavior, the influence of these quantities on the selected value of fuel injection quantity can be applied in the form of a multiplier M, for example, which multiplies this influence in the form of a factor F from the closed interval [0, 1] by the limiting value of the torque control signal RBM. Factor F is a function of the temperature T and corresponds to a temperature curve TK stored in the processor. Consequently, based on the measured temperature T of the engine and/or transmission, the processor takes the necessary factor F from the corresponding temperature characteristic curve TK to calculate the torque control value BM. The value BM appearing as the result from the multiplier M, together with the quantity MS representing the operator desired torque signal, is delivered to a quantity limiter MB, which determines the minimum of the two inputs BM and MS, and transmits this information as a torque control signal to the fuel pump in the form of the quantity of fuel to be injected ME.

Figure 4:
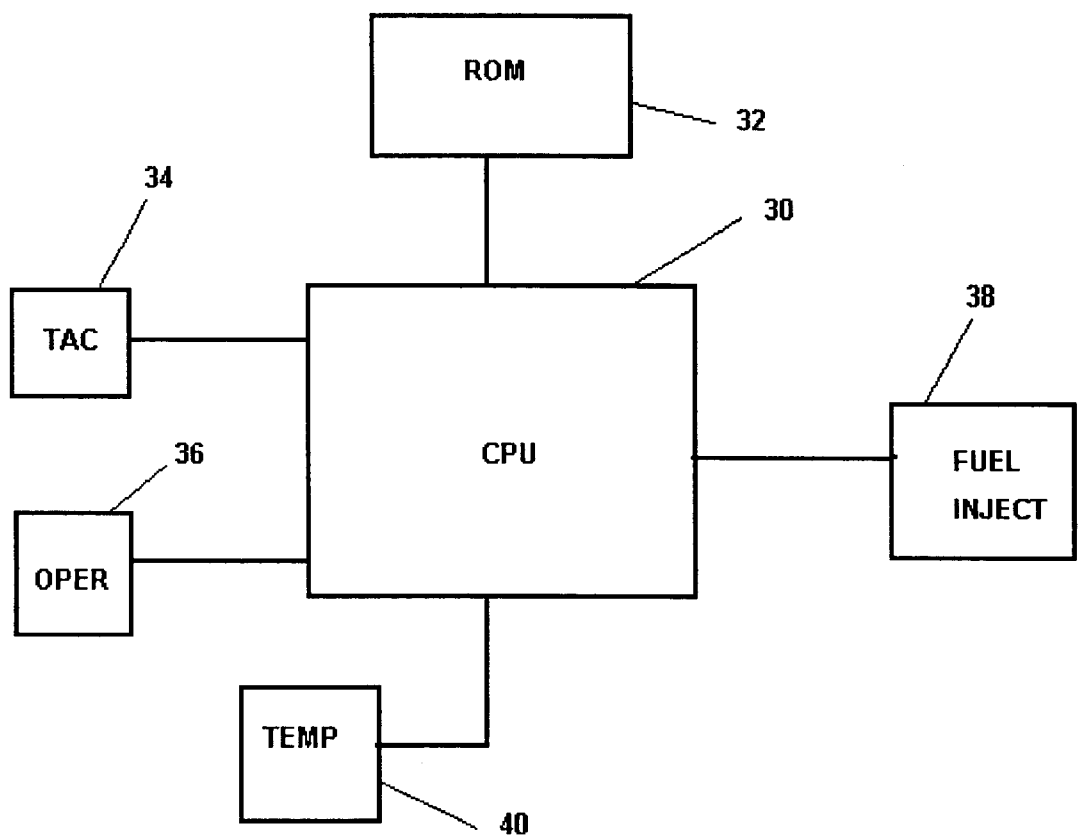
FIG. 4 is a block diagram of a system for controlling a drive train for reduced emissions.

FIG. 4 is a block diagram showing a control system for practicing the method of the invention using a digital processor 30, which is provided with a program stored in ROM 32 and including characteristic data representing limiting values of the output torque control signal as a function of engine speed and the multiplier F as a function of engine and/or transmission temperature. Processor 30 receives engine speed signals from tachometer 34 and desired acceleration signals from operator control 36. Temperature signals may also be provided from temperature sensor 40.

The processor of FIG. 4 carries out the computation of the output torque control signal as described above and provides this signal to control operation of fuel injection 38.

While there has been described what are believed to be the preferred embodiment of the present invention, those skilled in the art will recognize that other and further changes and modifications may be made thereto without departing from the spirit of the invention, and it is intended to claim all such changes and modifications as fall within the true scope of the invention.

I claim:

1. A method for operating a drive train having a fuel injection engine and a continuously variable transmission, wherein the fuel injection engine is capable of being operated using a controllable torque buildup, to reduce engine emissions, comprising:

a. providing data which corresponds to an emissions performance graph representing emissions as a function of engine torque and engine speed;
   b. controlling the torque buildup during acceleration of the fuel injection engine to avoid regions of torque and engine speed corresponding to high emissions regions in the emissions performance graph by limiting fuel injection quantity to a predetermined value for at least one selected range of engine speed.

2. The method of claim 1, wherein said injection quantity of fuel is further limited as a function of at least one of an engine temperature and a transmission temperature.

3. The method of claim 2, further comprising the step of multiplying a factor F representing said function of at least one of the engine temperature and the transmission temperature by said limited fuel injection quantity for a specific engine speed.

4. The method of claim 3, wherein the factor F is a number between zero and one.

5. A method according to claim 1 wherein said limiting said fuel injection quantity comprises limiting said quantity according to a characteristic function of engine speed.

6. Apparatus for controlling a drive train having a fuel injection engine and a continuously variable transmission to reduce engine emissions, comprising:

an operator activated torque control providing a signal representing desired acceleration;
   a sensor providing a signal representing engine speed;
   a fuel injector responsive to a supplied fuel injection signal;
   and a processor programmed to provide said fuel injection signal in response to said desired acceleration signal and said engine speed signal, said processor including data representing emissions performance of said engine as a function of torque and engine speed, and providing said fuel injection signal to avoid regions of torque and engine speed corresponding to high emissions data by limiting fuel injection quantity to a predetermined value for at least one selected range of engine speed.

7. The control system of claim 6, wherein there is further provided a temperature sensor providing a temperature signal to said processor representative of at least one of an engine temperature and a transmission temperature, and wherein said processor is programmed to provide said fuel injection signal as a function of said temperature signal.

8. The control system of claim 7, wherein said processor is programmed to derive a limiting value of said output fuel injection signal as a function of said engine speed signal, derive a multiplier factor F as a function of said temperature signal, multiply the limiting value of the fuel injection signal by the factor F and provide an output fuel injection signal which is the minimum of said limiting value multiplied by F and a value corresponding to said desired acceleration signal.

* * * * *